(12) United States Patent
Han et al.

(10) Patent No.: US 6,807,326 B2
(45) Date of Patent: Oct. 19, 2004

(54) OPTICAL MODULE FOR SUPPRESSING OPTICAL AND ELECTRICAL CROSSTALK SIMULTANEOUSLY

(75) Inventors: Young-tak Han, Daejeon (KR); Duk-jun Kim, Daejeon (KR); Jang-uk Shin, Daejeon (KR); Sang-ho Park, Daejeon (KR); Yoon-jung Park, Seoul (KR); Hee-keyng Sung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 10/379,297

(22) Filed: Mar. 3, 2003

(65) Prior Publication Data

US 2004/0028351 A1 Feb. 12, 2004

(30) Foreign Application Priority Data

Aug. 9, 2002 (KR) ................................ 10-2002-0047197

(51) Int. Cl.[7] ................................................ G02B 6/36
(52) U.S. Cl. ................................ 385/14; 385/92; 385/94
(58) Field of Search .......................... 385/14, 88, 89–94; 257/82, 544, 550

(56) References Cited

U.S. PATENT DOCUMENTS 6,282,000 B1 * 8/2001 Kikuchi et al. ............. 398/136
6,663,295 B2 * 12/2003 Kami et al. ................... 385/92
2002/0001427 A1 * 1/2002 Hashimoto et al. ........... 385/14
2003/0059178 A1 * 3/2003 Kobayashi et al. ........... 385/94
2003/0231842 A1 * 12/2003 Kropp .......................... 385/92

FOREIGN PATENT DOCUMENTS

JP      2000-075155         3/2000

OTHER PUBLICATIONS

Uno, Tomoaki, 1.3/1.55 um WDM Transceiver Modules for 155Mbps Application, IEEE, 2001, pp. 111–112.
Hashimoto, Toshikazu et al., Full duplex 1.3/1.55 um wavelength division multiplexing optical module using a planar lightwave circuit platform, IEEE, 1998, pp. 59–60.

* cited by examiner

Primary Examiner—Chau N. Nguyen
(74) Attorney, Agent, or Firm—Blakely Sokoloff Taylor & Zafman

(57) ABSTRACT

There is provided an optical module incorporating active elements such as light emitting devices or photo detective devices mounted on a single substrate. The optical module can suppress optical and electrical crosstalk by a blocking trench formed between the active elements for blocking optical and electromagnetic waves, and a metal barrier formed within the blocking trench for blocking the optical and electromagnetic waves. Further, the optical module can suppress the optical and the electrical crosstalk due to the optical and the electromagnetic waves directed upward the substrate by a housing body enclosing the substrate, a housing cover provided on the housing body, and a metal slit formed below the housing cover and above the metal barrier.

6 Claims, 4 Drawing Sheets

OPTICAL MODULE FOR SUPPRESSING OPTICAL AND ELECTRICAL CROSSTALK SIMULTANEOUSLY

BACKGROUND OF THE INVENTION

This application claims the priority of Korean Patent Application No. 2002-47197, filed on Aug. 9, 2002, in the Korean Intellectual Property Office, the disclosure of which is incorporated herein in its entirety by reference.

1. Field of the Invention

The present invention relates to an optical module, and more particularly, to an optical module incorporating active elements, such as light emitting devices like laser diodes or photo detective devices like photo diodes, mounted on a single substrate.

2. Description of the Related Art

Generally, an optical module incorporating active elements, having light emitting functions and photo detective functions, mounted on a single substrate and electrical wires for transmitting signals at high-speed bit rates is affected by optical crosstalk as well as electrical crosstalk, i.e., sensitivities of the photo detective elements are degraded due to the optical crosstalk, and signals for driving the light emitting elements and photoelectric signals converted via the photo detective elements interfere with each other and are distorted due to the electrical crosstalk.

Not only the optical crosstalk but also the electrical crosstalk should be suppressed particularly in a case of an optical module for processing signals very fast at the rate of or higher than a few giga-bits per second (Gbps). In other words, suppressing the optical and electrical crosstalk is a requisite for excellent sensitivity and signal processing. There have been proposed various methods for suppressing particularly the optical crosstalk.

FIGS. 1 to 5 show various structures of optical modules for suppressing optical crosstalk according to conventional methods. In FIGS. 1 to 5, identical elements are referred to by the same reference numerals.

FIG. 1 shows a structure of a conventional optical module, in which light absorption coating 3 made of resin for suppressing optical crosstalk is applied substantially across the surface of a silicon substrate 1. Reference numerals 5a and 5b refer to optical fibers.

FIG. 2 shows another conventional structure of the optical module shown in FIG. 1, in which the light absorption coating 3 made of resin for suppressing optical crosstalk is applied onto the surface of the silicon substrate 1 likewise in FIG. 1, but is removed from the areas where a light emitting device 7a and a photo detective device 7b are placed. Reference numeral 10 refers to transparent resin.

FIG. 3 shows a structure of another type of a conventional optical module, in which an optical wavelength selection filter 11 for suppressing optical crosstalk is placed between a light emitting device 7a and a photo detective device 7b mounted on a silicon substrate 1 by inserting the filter 11 into a groove formed in an optical waveguide 9. Particularly, the optical module shown in FIG. 3 suppresses faint light by inserting the optical wavelength selection filter 11 across the optical waveguide 9.

FIG. 4 shows another conventional structure of the optical module shown in FIG. 3, which adapts the method shown in FIG. 1. That is, the optical module shown in FIG. 4 includes the optical wavelength selection filter 11 mounted on the silicon substrate 1 as shown in FIG. 3, and the light absorption coating 3 applied substantially across the surface of the silicon substrate 1 as shown in FIG. 1. Reference numeral 13 refers to an adhesive for fixing the filter 11. Light emitted to free space from the optical wavelength selection filter 11 and the light emitting device 7a in the structure of FIG. 3 can be absorbed by the light absorption coating 3, and accordingly, the optical crosstalk can be more effectively suppressed in the optical module shown in FIG. 4. Although FIG. 4 shows the structure wherein the light absorption coating 3 is applied substantially across the surface of the silicon substrate 1 including the areas where the light emitting device 7a, photo detective device 7b, and the optical wavelength selection filter 11 are mounted, it is also possible to adapt the method shown in FIG. 2 such that the coating 3 is removed from the areas where a light emitting device 7a and a photo detective device 7b are placed.

FIG. 5 shows another conventional structure of the optical module shown in FIG. 4 using an alternative means for blocking light other than the light absorption coating 3, in which the light emitting device 7a, the photo detective device 7b, and the optical wavelength selection filter 11 are covered with caps 15 for blocking light, respectively. Briefly, FIG. 5 shows an optical module including light blocking caps 15 for suppressing faint light. The caps 15 are respectively fixed on the silicon substrate 1 through welding, and are made of a material not transmitting light such as sintered aluminum having airtight characteristics, or other adequately processed material such as resin, glass, etc.

As described above with reference to FIGS. 1 to 5, the conventional optical modules incorporate, as means for suppressing optical crosstalk, the light absorption coating 3 applied onto the surface of the silicon substrate 1, or the optical wavelength selection filter 11 inserted between the light emitting device 7a and the photo detective device 7b. While the conventional optical modules can suppress the optical crosstalk, the electrical crosstalk are unavoidable, particularly in the case of high-speed signal processing optical modules. Further, since a groove should be formed in the silicon substrate 1 to fix the optical wavelength selection filter 11, a precise control is required during the fabrication process of the optical module, and accordingly, as the fabrication cost is increased, it is unfavorable for implementing the optical module at low cost.

Meanwhile, the conventional optical module shown in FIG. 5 has a structure in which the active elements are covered with the caps 15 for suppressing the optical crosstalk. However, since the caps 15 for blocking light are made of dielectric material not transmitting the light, electromagnetic waves cannot be blocked while the light can be blocked, and therefore, the electrical crosstalk cannot be suppressed. Further, since the light can be subject to resonance within the optical module due to the light blocking caps 15, the light emitting device, e.g., a laser diode can be subject to chaos phenomenon. Furthermore, it is extremely hard to fix the caps 15 having very small sizes corresponding to those of the active elements through welding.

As described above, while the conventional optical modules can basically suppress the optical crosstalk, the electrical crosstalk due to electromagnetic waves are unavoidable, particularly in the case of high-speed signal processing optical modules. In the case of the optical modules for processing signals at low-speed rates, fairly good sensitivities can be achieved by suppressing the optical crosstalk below −40 dB, and isolating electric signal lines for light emitting devices and those for photo detective devices from each other. However, in the case of the optical modules for processing signals very fast at rates of or higher than a few Gbps, not only the optical crosstalk but also the electrical crosstalk should be suppressed in order to achieve good sensitivities and signal processing.

SUMMARY OF THE INVENTION

The present invention provides an optical module having a structure that can suppress not only optical crosstalk but also electrical crosstalk causing interferences between and distortions of signals for driving light emitting devices and photoelectric signals converted via photo detective devices.

An optical module according to an embodiment of the present invention includes a substrate; a plurality of mounting trenches spaced from each other for mounting active elements on the substrate; a blocking trench formed between the active elements mounted on the plurality of mounting trenches for blocking optical waves and electromagnetic waves; and a metal barrier formed in the blocking trench for blocking the optical waves and the electromagnetic waves.

An optical module according to another embodiment of the present invention includes active elements formed on a substrate; a blocking trench formed between the active elements for blocking optical waves and electromagnetic waves; a metal barrier formed in the blocking trench for blocking the optical waves and the electromagnetic waves; a housing body for enclosing the substrate including the active elements and the metal barrier, above the surfaces of the active elements; a housing cover for covering the housing body; and a metal slit connected to the housing cover, and placed below the housing cover and above the top of the metal barrier for blocking the optical waves and the electromagnetic waves.

An optical module according to still another embodiment of the present invention includes a substrate; a plurality of mounting trenches separated from each other for mounting active elements on the substrate; a blocking trench formed between the active elements mounted in the plurality of mounting trenches for blocking optical waves and electromagnetic waves; a metal barrier formed in the blocking trench for blocking the optical waves and the electromagnetic waves; a housing body for enclosing the substrate including the active elements and the metal barrier, above the surfaces of the active elements; a housing cover for covering the housing body; and a metal slit connected to the housing cover, and placed below the housing cover and above the top of the metal barrier for blocking the optical waves and the electromagnetic waves.

It is preferable that the inside walls of the housing body, the housing cover, and the metal slit are formed to have coarse surfaces to cause diffused reflection of the optical waves and the electromagnetic waves. Further, it is preferable that the metal barrier and the metal slit are placed to nearly contact with each other.

According to the present invention, not only the optical crosstalk but also the electrical crosstalk can be suppressed by the blocking trench formed between active elements and the metal barrier formed in the blocking trench. Further, according to the present invention, the metal slit formed below the housing cover and above the metal barrier can suppress the optical and the electrical crosstalk due to the optical and the electromagnetic waves directed upward the substrate.

BRIEF DESCRIPTION OF THE DRAWINGS

The above objects and advantages of the present invention will become more apparent by describing preferred embodiments thereof with reference to the attached drawings in which.

DETAILED DESCRIPTION OF THE INVENTION

Figure 1:
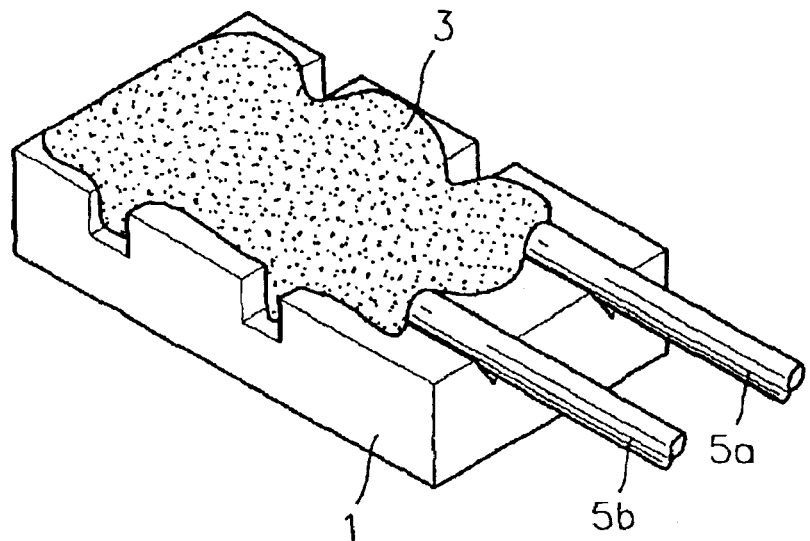
FIGS. 1 to 5 show various structures of optical modules for suppressing optical crosstalk according to conventional methods.
Figure 2:
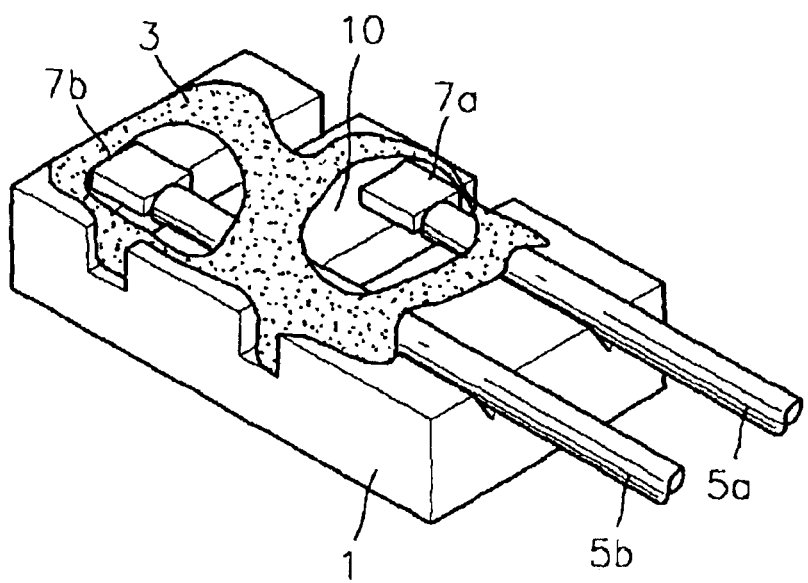
Figure 3:
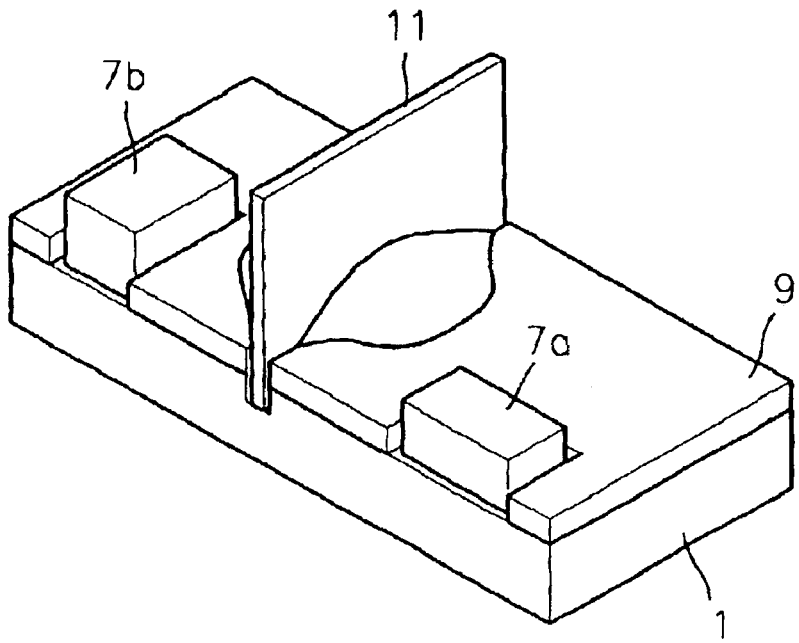
Figure 4:
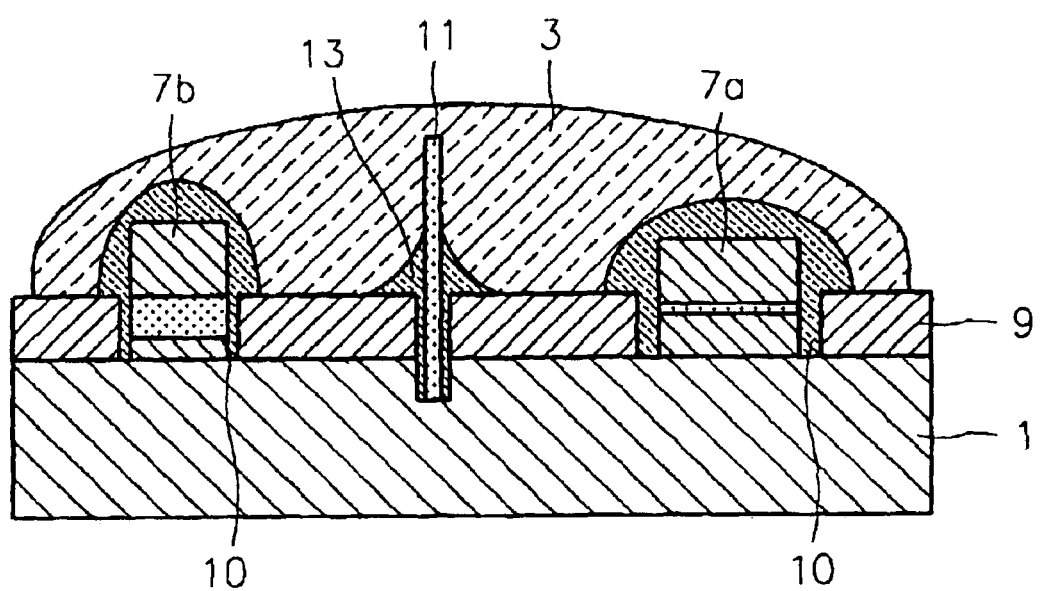
Figure 5:
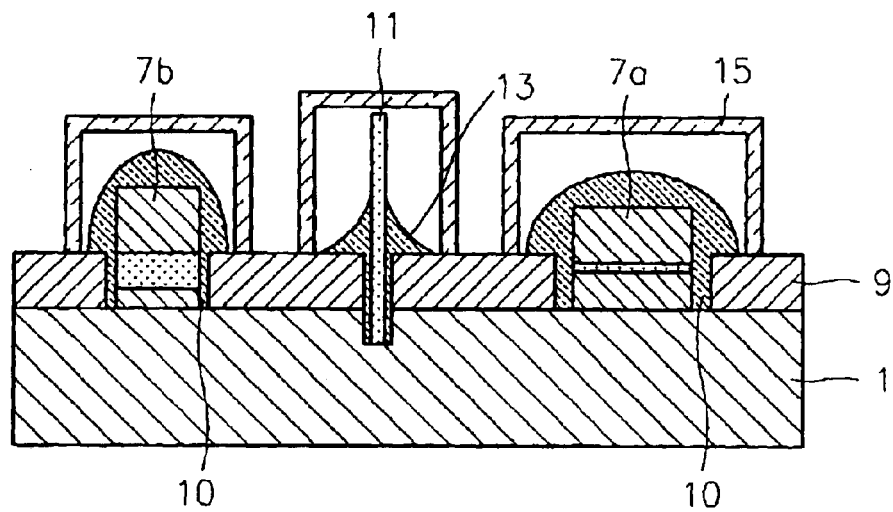
Figure 6:
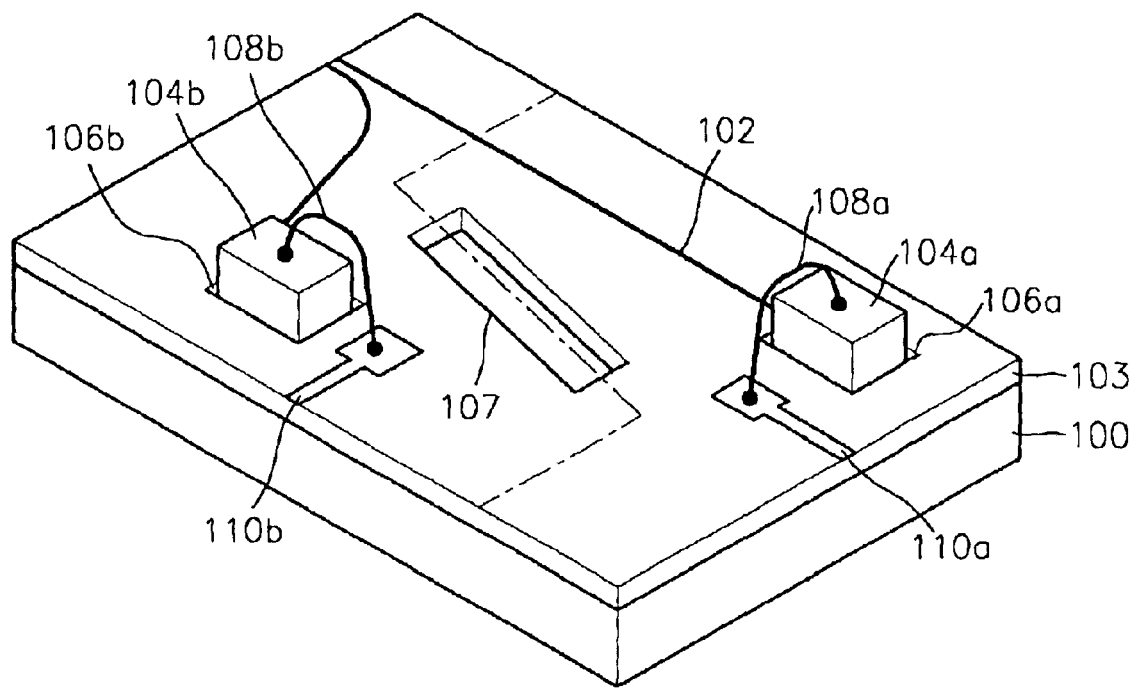
FIG. 6 shows an optical module, according to an embodiment of the present invention, for suppressing optical and electrical crosstalk.

Referring to FIG. 6, there is shown an optical module according to an embodiment of the present invention, in which a blocking trench for blocking optical and electromagnetic waves is formed between active elements, e.g., a light emitting device and a photo detective device.

More specifically, referring to FIG. 6, a silica coating 103 is formed on a substrate 100. The substrate 100 is preferably a silicon substrate. The silica coating 103 may be formed through flame hydrolysis deposition (FHD), plasma enhanced chemical vapour deposition (PECVD), etc. In FIG. 6, reference numeral 102 refers to an optical waveguide.

A plurality of mounting trenches 106a and 106b separated from each other for mounting active devices, e.g., a light emitting device 104a and a photo detective device 104b are formed on the substrate 100. In addition, a blocking trench 107 for blocking optical and electromagnetic waves is formed between the active elements 104a and 104b mounted on the plurality of mounting trenches 106a and 106b. The blocking trench 107 can be formed through etching a glass layer of about 30 $\mu$m using an inductive coupled plasma (ICP) equipment.

A signal line 108a connected to the light emitting device 104a and a bonding pad 110a are completely isolated by the blocking trench 107 from a signal line 108b connected to the photo detective device 104b and a bonding pad 110b. The bonding pads 110a and 110b are formed through photolithography, and the signal lines 108a and 108b connect the active elements 104a and 104b with the bonding pads 110a and 110b through wire bonding.

In addition, a metal barrier (not shown) can be formed in the blocking trench 107 located between the active elements 104a and 104b by inserting something made of a material that can block the optical and the electromagnetic waves, such as a silver plate, etc.

Figure 7:
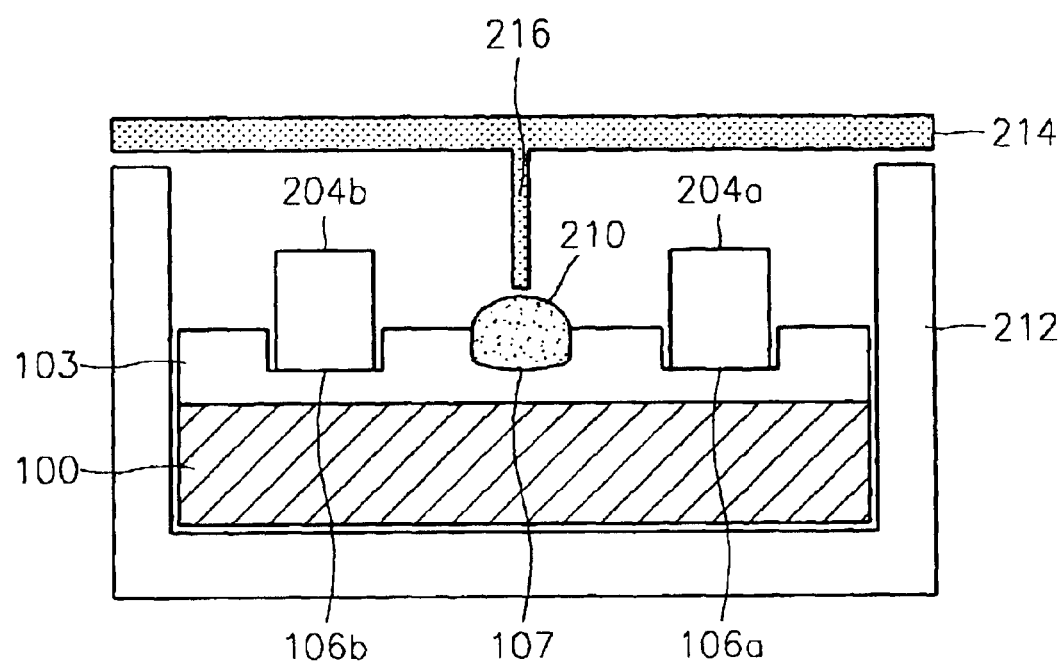
FIG. 7 shows an optical module, according to another embodiment of the present invention, for suppressing optical and electrical crosstalk.

FIG. 7 shows an optical module, according to another embodiment of the present invention, for suppressing optical and electrical crosstalk. In FIG. 7, the elements identical to those shown in FIG. 6 are referred to by the same reference numerals.

The optical module shown in FIG. 7 includes a metal slit formed and connected to a housing cover for blocking optical and electromagnetic waves directed upward a substrate. For convenience of description, there is shown a substrate 100 on which mounting trenches 106a and 106b, a blocking trench 107, light emitting and the photo detective devices 204a and 204b are formed in the same structure as in FIG. 6. It is possible to form the light emitting and photo detective devices on the substrate in a different formation.

Referring to FIG. 7, a blocking trench 107 is formed between active elements 204a and 204b to block optical and electromagnetic waves. A metal barrier 210, which can block the optical and electromagnetic waves, is formed within the blocking trench 107. The metal barrier 210 can be made of a metallic material such as silver paste as described above with reference to FIG. 6.

A housing body 212 encloses the substrate 100 including the active elements 204a and 204b, and the metal barrier 210 formed thereon, above the surfaces of the active elements 204a and 204b. Further, a housing cover 214 is provided on the housing body 212 to cover the housing body 212.

In addition, a metal slit 216 is formed below the housing cover 214 and above the metal barrier 210, and connected to the housing cover 214 to block the optical and electromagnetic waves. The metal slit 216 is placed along dotted lines shown in FIG. 6 above the blocking trench 107. The metal slit 216 and the metal barrier are formed to nearly contact with each other. Further, the inside walls of the housing body 212, the housing cover 214, and the metal slit 216 are formed to have coarse surfaces to cause diffused reflection of the optical waves and the electromagnetic waves so that the waves can be counterbalanced, and the optical and electrical crosstalk can be suppressed.

According to the present invention, not only the optical crosstalk but also the electrical crosstalk can be suppressed by the blocking trench formed between the active elements for blocking the optical and electromagnetic waves and the metal barrier formed within the blocking trench for additionally blocking the optical and electromagnetic waves.

Further, according to the present invention, the metal slit formed below the housing cover and above the metal barrier can suppress the optical and the electrical crosstalk due to the optical and the electromagnetic waves directed upward the substrate.

Moreover, according to the present invention, an optical module for suppressing optical and electrical crosstalk at the same time can be fabricated through a simple process, and accordingly, production cost thereof can be lowered and the optical module can be implemented at low prices in comparison with the conventional optical modules.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. An optical module comprising:

active elements formed on a substrate;

a blocking trench formed between the active elements, for blocking optical waves and electromagnetic waves;

a metal barrier formed in the blocking trench, for blocking the optical waves and the electromagnetic waves;

a housing body for enclosing the substrate including the active elements and the metal barrier formed thereon, above the surfaces of the active elements;

a housing cover for covering the housing body; and a metal slit connected to the housing cover and placed below the housing cover and above the top of the metal barrier, for blocking the optical waves and the electromagnetic waves.

2. The optical module according to claim 1, wherein inside walls of the housing body, the housing cover, and the metal slit are formed to have coarse surfaces to cause diffused reflection of the optical waves and the electromagnetic waves.

3. The optical module according to claim 1, wherein the metal barrier and the metal slit are placed to nearly contact with each other.

4. An optical module comprising:

a substrate;

a plurality of mounting trenches separated from each other, for mounting active elements on the substrate;

a blocking trench formed between the active elements mounted in the plurality of mounting trenches, for blocking optical waves and electromagnetic waves;

a metal barrier formed in the blocking trench, for blocking the optical waves and the electromagnetic waves;

a housing body for enclosing the substrate including the active elements and the metal wall formed thereon, above the surfaces of the active elements;

a housing cover for covering the housing body; and a metal slit connected to the housing cover and placed below the housing cover and above the top of the metal barrier, for blocking the optical waves and the electromagnetic waves.

5. The optical module according to claim 4, wherein inside walls of the housing body, the housing cover, and the metal slit are formed to have coarse surfaces to cause diffused reflection of the optical waves and the electromagnetic waves.

6. The optical module according to claim 4, wherein the metal barrier and the metal slit are placed to nearly contact with each other.

* * * * *